Nov. 16, 1971 J. E. CONANT ET AL 3,619,912
VISUAL SIMULATION DISPLAY SYSTEM
Filed Aug. 9, 1968 4 Sheets-Sheet 1
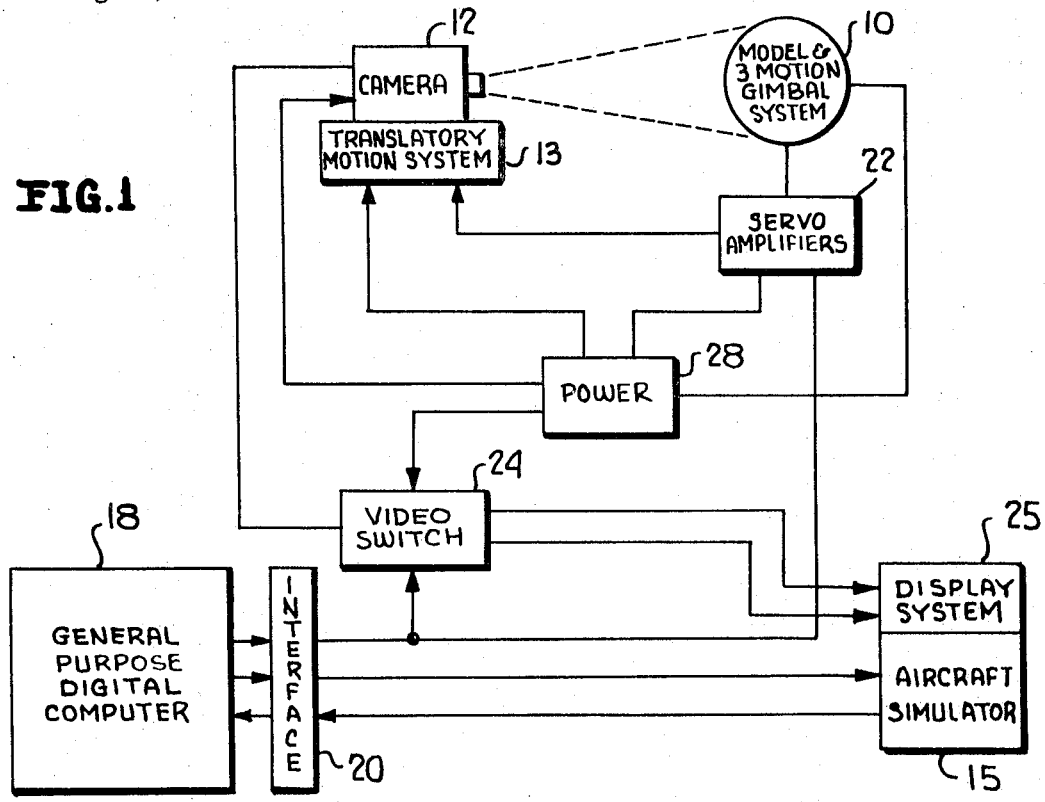
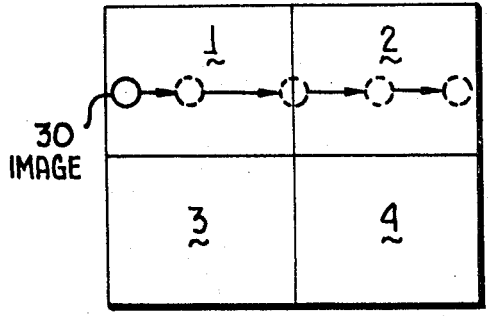
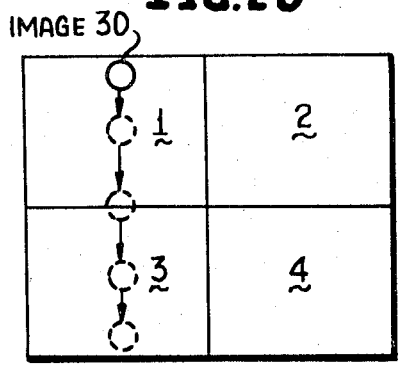
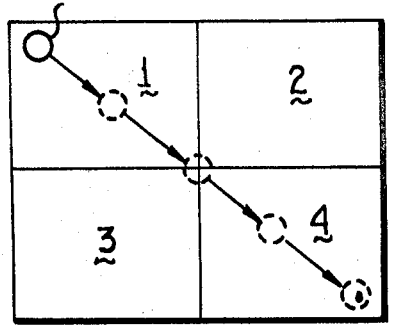
INVENTORS
JOHN E. CONANT &
WALTER F. BUCZEK
BY Hurvitz, Rose & Greene
ATTORNEYS

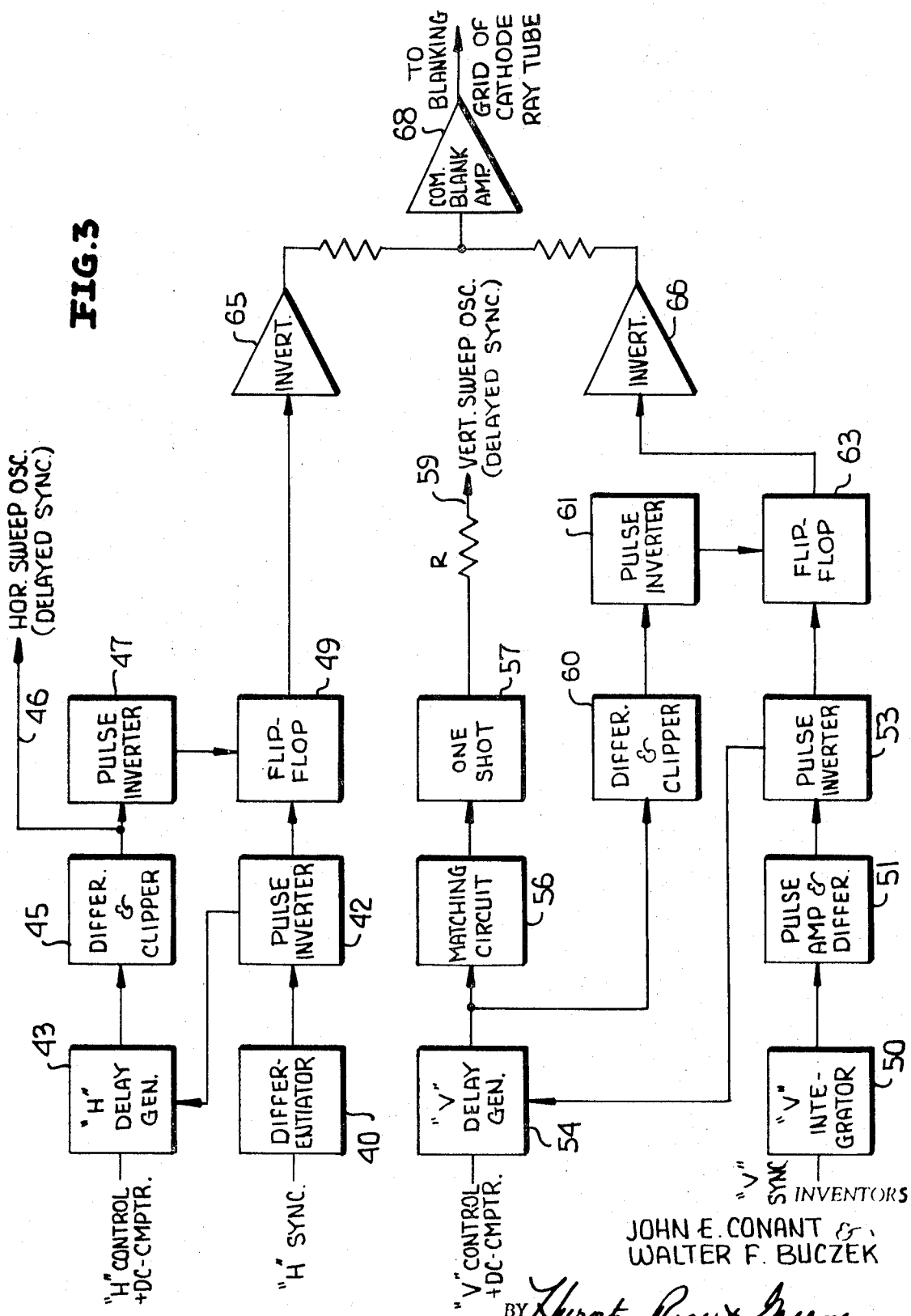

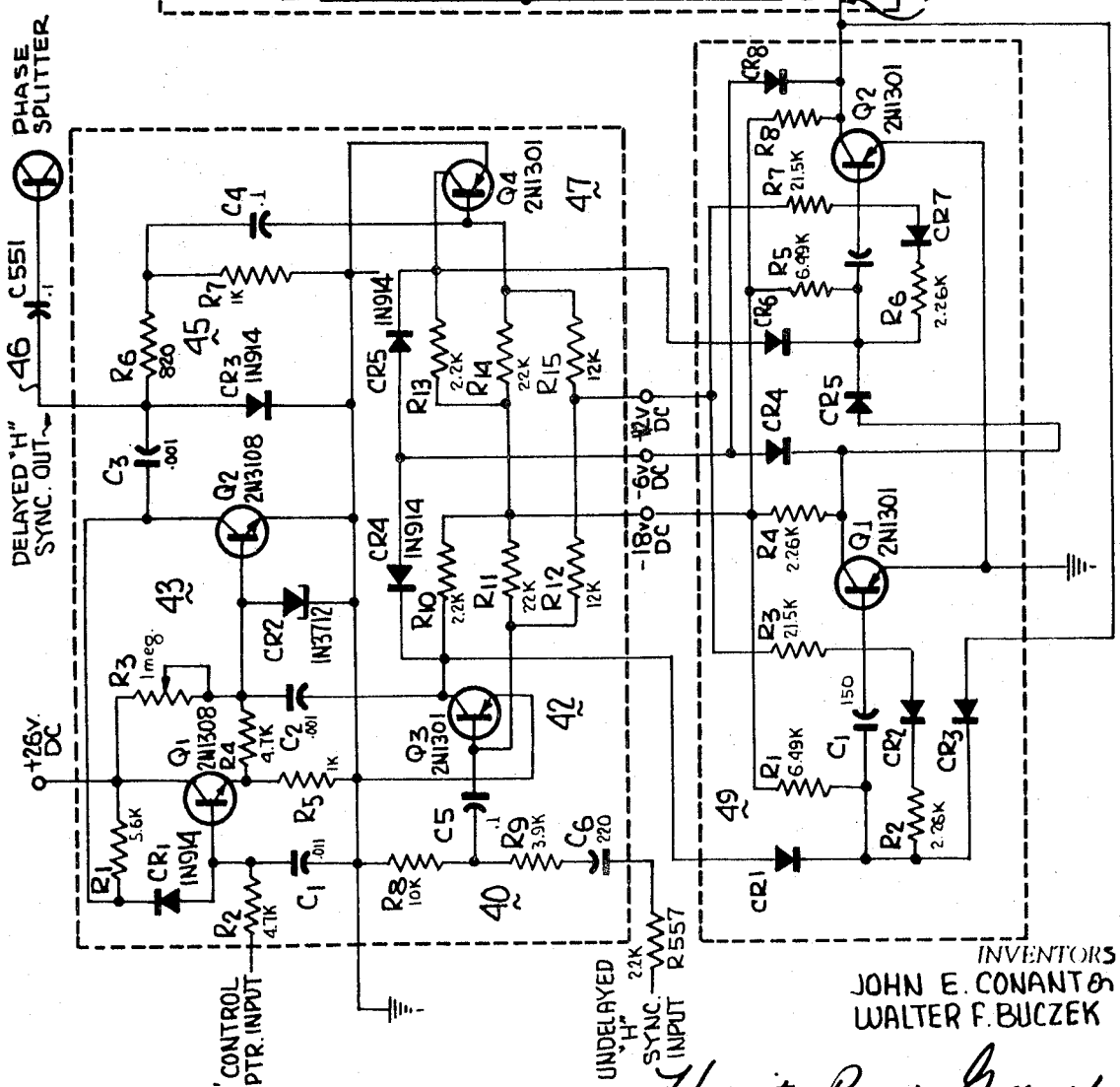

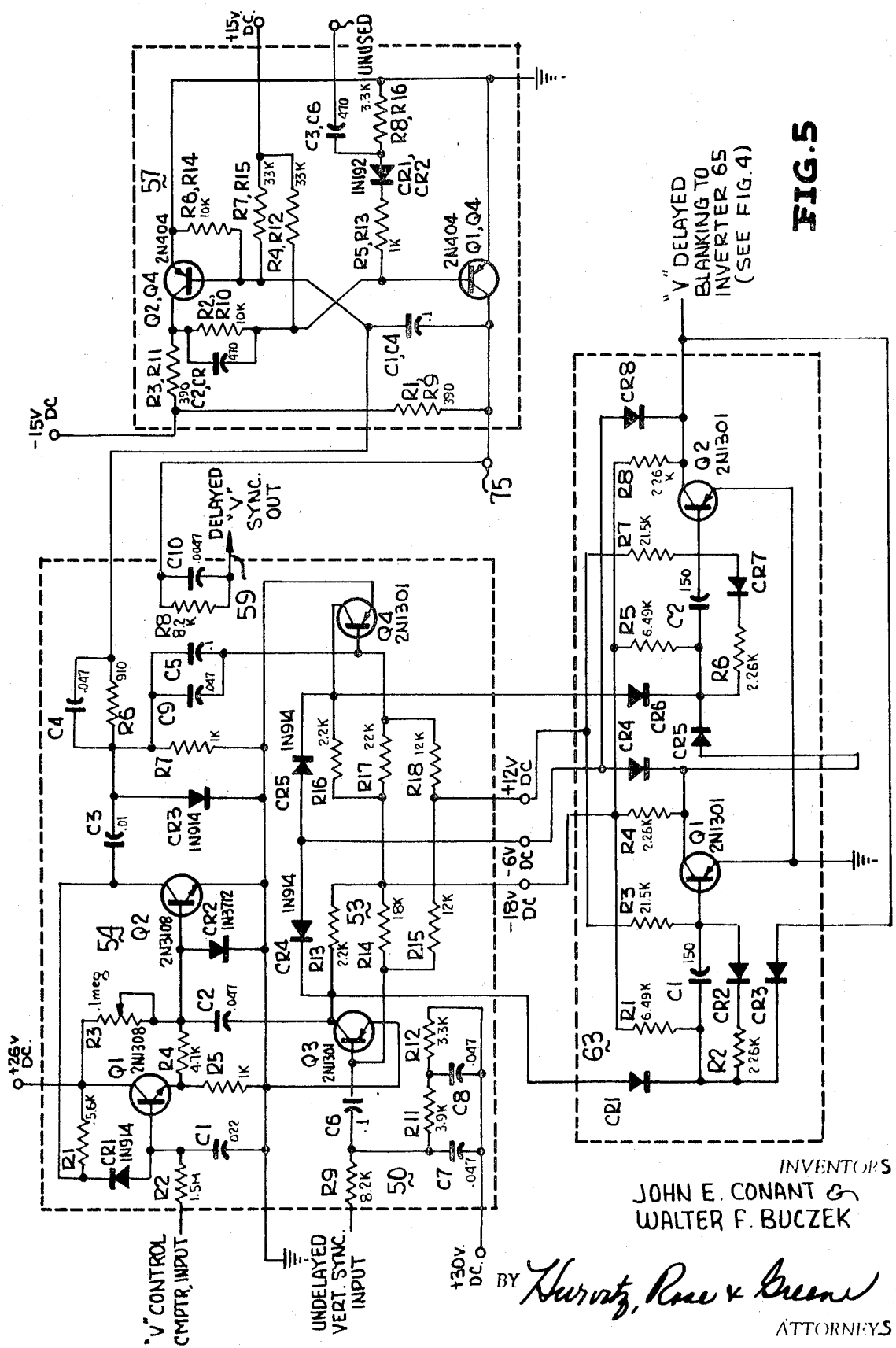

United States Patent Office 3,619,912
Patented Nov. 16, 1971

3,619,912
VISUAL SIMULATION DISPLAY SYSTEM
John E. Conant, Arlington, and Walter F. Buczek, Springfield, Va., assignors to Melpar, Inc., Falls Church, Va.
Filed Aug. 9, 1968, Ser. No. 751,522
Int. Cl. B64g 7/00; G09b 9/08
U.S. Cl. 35—12                                                    5 Claims

ABSTRACT OF THE DISCLOSURE

An optical image display is provided in a mosaic of contiguous individual television monitors whose rasters are suitably swept and blanked to permit translation of the desired image in any direction across the display screens or faces of the several television monitors, to simulate in a training environment a realistic view of the actual scene or visual conditions to which the trainee is to be subjected. Motion of the display image in any direction across the face of each monitor and in transition from one monitor to another in a continuous picture sequence may be accomplished by computer techniques, or by manually operated controls.

BACKGROUND OF THE INVENTION

The present invention relates generally to visual display systems and more particularly to a visual flight simulator for providing the image of a target, such as an aircraft, the sun and/or terrain or cloud surfaces, to a trainee operating in a simulated or imitated aircraft environment. In general, the trainee pilot will utilize controls similar to those in the actual vehicle cockpit and by virtue of the visual simulation display system of the present invention can visually "fly" the craft in a synthetic situation.

In the past, the method most commonly utilized for simulating a visual aircraft or space craft flight path has been to provide the desired image on a conventional cathode ray tube in a closed circuit television system. The electronic bandwidths and attendant visual resolution available in such systems places severe limitations on picture size and angle of view, both vertically and horizontally. These limited fields of view have proved insufficient to simulate many training situations.

It is a principal object of the present invention to provide a new and improved apparatus capable of presenting to a pilot trainee a continuous picture having a field of view equal to or greater than the maximum view available from an aircraft cockpit. Preferably, the cockpit is controllable in several degrees of freedom, for example six, by the trainee pilot to provide the psychlologically realistic impression of flight in a synthetic visual environment.

While our invention will be discussed primarily in relationship to visual display systems for aircraft flight simulation to provide images or targets appropriate thereto, it should be emphasized that the invention is not so limited, but may be used to provide a translatable image or scene suitable in conjunction with the simulated operation of any desired vehicle.

SUMMARY OF THE INVENTION

According to the invention, an aircraft simulator, such as the synthesized cabin of an aircraft or spacecraft, complete with controls, instrumentation, and so forth, as provided in the actual craft, and which may and preferably does also contain an instructor's position, has a display system comprising a mosaic of individual television rasters arranged in contiguous rows and columns for supplying a continuous wide-angle view, corresponding to or greater than that afforded in the actual craft, to the pilot trainee. Vertical and horizontal delayed sync and blanking information is supplied to each monitor, by computer or manual techniques, for coordination of the several monitors in an overall display in which an image target is translated in a path across the several monitors, in any direction thereacross, to correspond to the path of such an image in actual flight of the craft as simulated by the controls exercised by the trainee.

Each monitor is supplied with delayed sync pulses and blanking information from its own video control network, with control coordination effected, in a preferred embodiment, by computer input signals developed in response to trainee control. The horizontal and vertical sync information is supplied to each video control network from a television camera in a closed circuit system, in which a target model having several degrees of freedom is scanned.

Accordingly, it is another basic object of the present invention to provide control of image motion on a display screen, panel, or other viewing region, by controlling the synchronization delay information supplied to the circuitry governing the projection of the image on various portions of the viewing region.

BRIEF DESCRIPTION OF THE DRAWINGS

The above and still further objects, features, and attendant advantages of the present invention will become apparent from a consideration of the following detailed description of a preferred embodiment thereof, especially when taken in conjunction with the accompanying drawings, in which:

FIG. 1 is a block diagram of an overall system according to the invention;

FIGS. 2(a), (b), and (c) are diagrammatic illustrations of the faces of several television monitors arranged in a mosaic of contiguous edges, and showing exemplary image translation across the several faces.

FIG. 3 is a block diagram of one of several similar units of the video switching or control network of FIG. 1;

FIG. 4 is a schematic diagram of the horizontal delayed sync and blanking circuitry of the unit of FIG. 3; and FIG. 5 is a schematic diagram of the vertical delayed sync and blanking circuitry of the unit of FIG. 3.

DESCRIPTION OF THE PREFERRED EMBODIMENT

Referring now to FIG. 1, an overall system in which our invention may be used includes a target aircraft or model supported by a gimbal system with, say, 3-degrees-of-freedom of motion, such an arrangement generally designated by reference numeral 10; a television camera 12 which is itself supported by a translatory system 13, the latter operated in accordance with the control exercise by the trainee pilot in his simulated cockpit 15; a general purpose digital computer 18 together with the necessary interface and peripheral equipment 20 to develop the desired control functions from inputs supplied by the aircraft simulator 15 and internal memory; a servo-amplifier system 22 for operating the camera translatory motion system 13 in accordance with the control signals or functions deriving from the computer 18 in response to the inputs by the control section of the simulator 15, the computer supplying the appropriate control data or commands to servo amplifier network 22 typically in the form of analog signals via the interface equipment 20; the servo amplifier network 22 further controlling the model and gimbal motion system 10, preferably independently of the motion of the camera 12; a video switch network 24 responsive to inputs from the camera 12 and the computer 18 (or interface system 20 connected thereto) to supply appropriate information to the video monitors of display system 25; and a suitable source of power 28 for supplying operating voltages and currents to camera 12, model and gimbal motion system 10, translatory motion system 13, servo amplifiers 22, and video switch network 24.

The overall arrangement shown in FIG. 1 may be referred to as a simulator and image acquisition system and may largely comprise conventional and commercially available components apart from those to be discussed in detail in the ensuing description. In the operation of this system, the trainee pilot normally occupies the aircraft simulator 15 and is presented with an optical image display on display system 25 which should be at least as large as the field of view which would be presented to him in the actual aircraft imitated or synthesized by simulator 15. Simulator 15 normally contains controls, instrumentation, and other components apparently identical in operation, style and arrangement to those in an actual aircraft of the type simulated. In general, by operating the controls the pilot trainee supplies information, usually in the form of analog signals, to the interface equipment 20, which in turn effects the necessary conversions to supply digital data to the computer 18. In response, the computer supplies information via the interface equipment back to the aircraft simulator to simulate the response of the aircraft to the controls exercised by the trainee, in respect to motion, instrument readings, and so forth, and further supplies information to servo amplifiers 22 and video switch network 24. The servo amplifiers operate to translate television camera 12 via its motion system 13 according to the demands of the control exercised by the pilot trainee in simulator 15. It will be understood by those skilled in the art to which the invention pertains that this requires real-time operation by the computer and interface equipment. As previously stated, the model and its gimbal motion system 10 are preferably operated independently of the motion imparted to the camera system and of the control exercised from the simulator 15, as would ordinarily be the case in the real world.

Our invention resides primarily in the structure and functions of video switch network 24 and display system 25 responsive to signal inputs from television camera 12 and the digital computer-interface equipment, to provide the trainee pilot with a view of the model or target, acquired by television camera 12, over a field of view corresponding to at least that which would be observed if the trainee were in an actual aircraft of the type simulated. To this end, a wide-angle image is assembled as a mosaic of images generated on a plurality of contiguous television monitors in display system 25. For example, four vertically stacked rows of seven monitors each (i.e., four rows, seven columns) might be utilized to achieve a field of view of ±170° horizontal by +90° and —60° vertical. Such an arrangement creates an image mosaic of twenty-eight individual sections, and as will subsequently be explained, each displaced by a time difference from the others by virtue of the operation of video switch network 24 in accordance with the information supplied thereto from the computer-interface equipment.

The problem is perhaps best illustrated by reference to FIGS. 2(a), (b), and (c). For the sake of simplicity a mosaic of four television monitors is shown, although it is to be understood that the principles of the present invention are applicable to practically any number of contiguously arranged monitors or cathode ray tube faces in rows and columns. It is desired to translate an image 30 from the left edge of the monitor designated 1 across its face to the right edge thereof, and to transfer the image continuously (i.e., in an apparently unbroken or uninterrupted sequence, as would be the case for an actual unhindered view in the cockpit or cabin of the craft) to the left edge of monitor 2, across its face and to the right edge, as shown in FIG. 2(a) by the succession of arrows and dotted time sequential positions of the initial image 30. Of course, a similar capability should exist as to horizontal image transfer in either direction between monitors 3 and 4, and the image movement should occur at a standard frame rate commensurate with reality of motion. Image movement must also be accomplished in a vertical direction, as shown in FIG. 2(b) for monitors 1 and 3, from the top edge of the upper monitor to the bottom edge, with transfer to the top edge and across the face to the bottom edge for successively lower-positioned monitors. Diagonal movement of the image as shown in FIG. 2(c) is also necessary and desirable. Here again, movement along either major diagonal or along smaller diagonals covering portions of more than one monitor face should be permitted.

The electronics required to implement this image translation on the several monitors consists of that shown as video switch network 24 in FIG. 1 together or in conjunction with the modified circuit of each television monitor of display system 25. In a constructed embodiment, each of the television monitors constituted an R.C.A. model KCS 153 chassis, the specific circuit details of which are available from the Radio Corporation of America. Since only the target image is to appear on the cathode ray tube (CRT) of the television monitor, it is necessary to blank all the CRT's, and then unblank the area in which the target appears. Using television camera 12 and model 10, the video signals from the camera are applied to the video switch network 24 (FIG. 1) to accomplish the unblanking. Blanking signals are generated to move along with the horizontal and vertical sweep signals.

The circuitry required for generating the horizontal delayed sync (synchronization) pulse, and the signal conditioning circuits for the horizontal blanking for each television monitor, are shown in the upper portion of FIG. 3; and in the lower portion, the circuitry required for the generation of vertical delayed sync and blanking. Referring to FIG. 3, the horizontal sync pulses contained in the video signal from the camera of the closed circuit television system (or transmitted from a remote television transmitting station, if desired) are applied to a differentiator 40 which supplies an input to pulse inverter 42. The pulse inverter feeds a horizontal delay generator 43 and also supplies triggering pulses to a flip-flop 49. The extent of the horizontal sync pulse delay imparted by delay generator 43 is controlled by the computer, and such computer control signals may be supplied in any convenient and conventional fashion. The delayed sync pulses are differentiated and clipped in unit 45 and are then supplied along path 46 to the horizontal sweep oscillator as delayed sync pulses. The output pulses of unit 45 are also supplied to a pulse inverter 47 which provides a second trigger pulse input to flip-flop 49.

In the vertical control section required for each monitor in the video electronics network 24 of FIG. 1, the vertical synchronization pulses are applied to an integrator 50 whose output signal is applied to a pulse amplifier differentiator network 51 which feeds pulse inverter 53. The output signal of the inverter is applied to the vertical delay generator 54, and additionally to a flip-flop 63. As in the case of the horizontal sync pulses, the extent of delay imparted by the vertical delay generator 54 is controlled by appropriate signals from the computer, and will depend upon the time displacement desired for the particular monitor in question relative to image translation on a preceding monitor. The delayed output pulses of the generator 54 are applied in parallel to a matching circuit 56 and to a differentiator clipper 60. The matching circuit supplies a trigger input to one shot multivibrator 57 whose output is utilized on path 59 to the vertical sweep oscillator as delayed sync pulses for the appropriate monitor.

The output pulses of differentiator and clipper network 60 are inverted by unit 61 and supplied as the second trigger input to flip-flop 63. The outputs of flip-flops 49 (horizontal) and 63 (vertical) supply the blanking information to the appropriate television monitor in the form of signals which are inverted in respective inverting networks 65 and 66 prior to application to a combined blanking amplifier 68. The output of the latter is applied to the grid of the cathode ray tube in the appropriate television monitor of the display system 25.

It is, of course, necessary to insert the delayed sync and blanking signals into the respective television monitor circuit to control the television image motion. To this end, the existing horizontal sync circuitry and vertical sync circuitry of the appropriate conventional television monitor are opened to respectively insert the delayed horizontal sync and delayed vertical sync pulses. Similarly, the existing blanking is removed from the grid of the cathode ray tube of the monitor and the delayed blanking added to control the raster brightness.

The horizontal delayed sync and blanking circuitry is shown in schematic form in FIG. 4. The horizontal delay generator 43 of FIG. 3 includes an R-C network composed of resistor $R_2$ and capacitor $C_1$ to develop a ramp signal whose amplitude, as a function of time, is controlled by the input signal from the computer-interface equipment. The maximum horizontal delay required to horizontally displace the image one complete frame is 63 microseconds, for this particular embodiment. The ramp signal is applied to transistor $Q_1$, the output of which increases, at the emitter terminal across load resistor $R_5$, until it reaches the firing voltage of tunnel diode $CR_2$. At that point transistor $Q_2$ saturates, permitting capacitor $C_1$ to discharge through diode $CR_1$ and via its ($Q_2$'s) collector-emitter path to ground. Thus, the ramp appearing at the emitter terminal of transistor $Q_1$ has the desired full charging duration time, 63 microseconds in this exemplary embodiment, whereas the sync pulse and ramp are delayed approximately 30 microseconds, at the collector electrode of the transistor $Q_2$. The latter delay represents a physical image displacement of approximately 50 percent of the CRT display screen width. After capacitor $C_1$ discharges, the cycle repeats itself. Since the amount of delay introduced into the sync pulse and ramp is a function of the time required for the output of transistor $Q_1$ to reach the firing voltage of tunnel diode $CR_2$, and that time is in turn determined by the slope of the ramp signal developed by R-C circuit $R_2$ and $C_1$, the extent of delay introduced is controlled by the computer input signal applied to the R-C circuit.

The sync signal obtained from the camera is applied to the base of the transistor $Q_3$ of unit 42 and inverted thereby for application to the anode of the tunnel diode $CR_2$ of delay generator 43 to control the firing point of the diode. The delayed sync output of transistor $Q_2$ is differentiated and clipped by unit 45, and inserted in the horizontal sweep section of the monitor via path 46 so that the start of the horizontal sweep of the monitor is delayed by an amount determined by the input signal from the computer.

The undelayed sync pulse at the collector of transistor $Q_3$ of unit 42 is clamped to —6 volts via diode $CR_4$ and is used to set flip-flop 49 via diode $CR_1$ thereof, to provide horizontal blanking signal to the CRT of the monitor. The delayed sync pulse output of unit 45 is inverted by transistor $Q_4$ of inverter unit 47 and also clamped to —6 volts, via diode $CR_5$. The inverted sync pulse is used to reset the flip-flop to change its state at the desired moment, and thereby to unblank the CRT.

The combiner, in the form of an operational amplifier 68, receives blanking gates from both the horizontal and the vertical blanking gate generators via inverters 65 and 66. Thus, the blanking gates are inverted and summed in the operational amplifier 68 to provide the desired voltage magnitude of blanking signal, here, —70 volts, for the application to the CRT of the monitor. This new blanking signal is applied to the grid of the CRT to remove the raster preceding and following the normal image display video. The normal video signal drives the cathode of the CRT in the conventional manner.

FIG. 5 is a schematic diagram of the circuitry employed in the vertical delayed sync and blanking generator of FIG. 3. The vertical sync control operation is similar to the horizontal sync generator operation, except for the longer time constant (e.g., a requirement of 16.6 milliseconds) derived in the ramp generator R-C circuit ($R_2$, $C_1$) of vertical delay generator 54, and the circuit changes required for output signal conditioning. The vertical sync is applied to transistor $Q_3$ of unit 53 and inverted thereby for application to the anode of tunnel diode $CR_2$ of delay generator 54 to control the firing voltage thereof. As before, the computer input controls the amplitude of the ramp voltage developed by the R-C circuit as a function of time, and by virtue of operation corresponding to that previously described for the horizontal section, a delayed sync pulse is generated at the collector terminal of transistor $Q_2$ of the delay generator.

It is, of course, essential that the characteristics of composite RMA standard signal synchronizing and blanking pulses be retained to achieve proper interlace of the vertical fields. The vertical sync pulse is applied to integrator 50 and appears at the junction of resistor $R_9$ and capacitor $C_6$ thereof, and as stated above is applied to transistor $Q_3$ to develop firing voltage control and a set of pulses for flip-flop 63.

The vertical delayed sync pulse is of insufficient duration, as it comes from generator 54, to drive the vertical sweep circuit of the respective monitor. Accordingly, the delayed pulse is used to trigger a one-shot multivibrator 57 which, in turn, produces a pulse of sufficient width and polarity to drive the vertical sweep generator in the monitor. These delayed vertical sync pulses are supplied at terminal 75 of the one-shot multivibrator 57 to the input of the vertical integrator of the television monitor circuit, path 59.

Vertical blanking signal is genertaed at the output of flip-flop 63 of FIG. 5 in a manner corresponding to that described in regard to the operation of the horizontal blanking section of FIG. 4.

By providing the proper delay and blanking for each monitor in terms of coordinated input from the computer to the several monitor controllers of switch network 24, with sync obtained from the camera, each monitor's raster is appropriately blanked except at the point or region at which the target image appears, and the image proceeds across the faces in accordance with the sync pulses. Accordingly, the display system is provided with a capability of generating dynamic image display motion in all directions across the mosaic of several television monitor cathode ray tubes by electronic means, utilizing computer-controlled voltage variable delayed sync pulses and blanking of each television monitor as desired to effect the image translation across the CRT faces. It is to be understood, of course, that manual controlled voltage variable sync delay techniques may be utilized in place of the computerized operation if desired. In a constructed embodiment, it was observed that the picture image could be translated across the face of each television monitor of several contiguous rows and columns and transferred between the monitors with the appearance of a continuous picture.

It is to be emphasized that the component designations and values shown in the figures are to be taken as purely illustrative with respect to the embodiment described, and are not to be considered as limiting the invention.

While we have disclosed a preferred embodiment of our invention, it is apparent that variation of the specific details of construction which have been illustrated and described may be resorted to without departing from the spirit and scope of the invention, as defined in the appended claims.

We claim:

1. The method of effecting continuous motion of a movable object in the field of view of a television camera across a mosaic pattern of viewing screens for a plurality of television receivers, said mosaic pattern of viewing screens constituting the field of view of an operator of a vehicle simulator, said vehicle simulator including control means simulating the motion-control mechanism of a simulated vehicle, said method including the steps of:
- (a) transmitting sweep synchronization pulses and a video signal representative of said movable object from said television camera;
- (b) driving the cathode beam of all of said receivers with said video signal;
- (c) delaying said sweep synchronization pulses by a plurality of delay intervals for respective ones of said receivers in accordance with the current position of said image on said mosaic pattern of viewing screens;
- (d) initiating sweeping of the cathode beam of each receiver with a respective delayed synchronization pulse;
- (e) blanking the rasters of said receivers at all locations on said mosaic pattern of viewing screen which are not at or immediately contiguous the current location of said image on said mosaic pattern;
- (f) moving said object relative to said television camera to effect corresponding motion of said image across said mosaic pattern of viewing screens; and
- (g) moving said television camera relative to said movable object in response to operation of said control means.

2. In a vehicle simulator system:
a visual display for simulating a field of view for the system operator, said visual display comprising:
   a plurality of television receivers, each having its own viewing screen and its own circuit means responsive to applied synchronization pulses for sweeping its cathode beam across said viewing screen, the viewing screens of said receivers being arranged in a continuous mosaic pattern;
   means for generating common sweep synchronization pulses for all of said receivers and a video signal representative of an image to be displayed on said mosaic pattern of viewing screens;
   means for applying said video signal to drive the cathode beams of each of said receivers;
   means for delaying said sweep sychronization pulses by different delay periods for each receiver in accordance with the desired position of said image on said mosaic pattern of viewing screens;
   means for applying the delayed sweep synchronization pulses to respective ones of said circuit means; and
   means for blanking the raster of each of said viewing screens except for areas of those viewing screens at which said image is located;
      wherein said means for generating comprises a television camera and a movable object disposed in the field of view of said television camera;
   control means for simulating the motion control mechanism of the vehicle being simulated; and
   means responsive to operation of said control means for moving said television camera relative to said movable object.

3. A vehicle simulator comprising.
a television camera for providing an image of its field of view;
a plurality of television monitors, each arranged to receive said image, positioned with their display screens contiguous one another and in the field of view of an operator of said simulator, each monitor having its own circuitry for sweeping and blanking the raster of that monitor;
timing means for varying the timing of said sweeping and blanking of the rasters of said monitors;
means for co-ordinating said timing means to permit translation of said image in any direction continuously across the display screen of two or more of said monitors to effect a continuous transition of said image from one display screen to another;
at least one control mechanism simulating a motion-controlling mechanism employed in vehicles of the type being simulated; and
control means responsive to actuation of said control mechanism for moving said television camera and to vary said field of view and for controlling said means for co-ordinating to effect translation of said image across said display screens to a degree commensurate with the variation of said field of view.

4. The vehicle simulator according to claim 3 further comprising a simulated target and operable means for moving said simulated target in a plurality of degrees of motion.

5. The vehicle simulator according to claim 3 wherein said control means includes means for programming motion of said simulated target relative to said field of view of said television camera.

References Cited
UNITED STATES PATENTS

| | | | |
|---|---|---|---|
| 3,422,207 | 1/1969 | Flower et al. | 35—12 X |
| 3,012,337 | 12/1961 | Spencer, Jr., et al. | 35—12 |
| 3,071,706 | 1/1963 | Waldorf | 313—70 |

ROBERT W. MICHELL, Primary Examiner

L. R. OREMLAND, Assistant Examiner

U.S. Cl. X.R.

178—6